3,337,633
PRODUCTION OF ISOPHORONE
Karl Schmitt, Herne, Westphalia, and Josef Disteldorf, Wanne-Eickel, Germany, and Wolfgang Baron, deceased, late of Bochum, Germany, by Gunhild Baron, nee Mayer, legal representative, Marburg (Lahn), Germany, assignors to Hibernia Chemie, G.m.b.H., Gelsenkirchen-Buer, Germany, a corporation of Germany
Filed Dec. 18, 1961, Ser. No. 160,359
Claims priority, application Germany, Dec. 31, 1960, B 60,703
11 Claims. (Cl. 260—586)

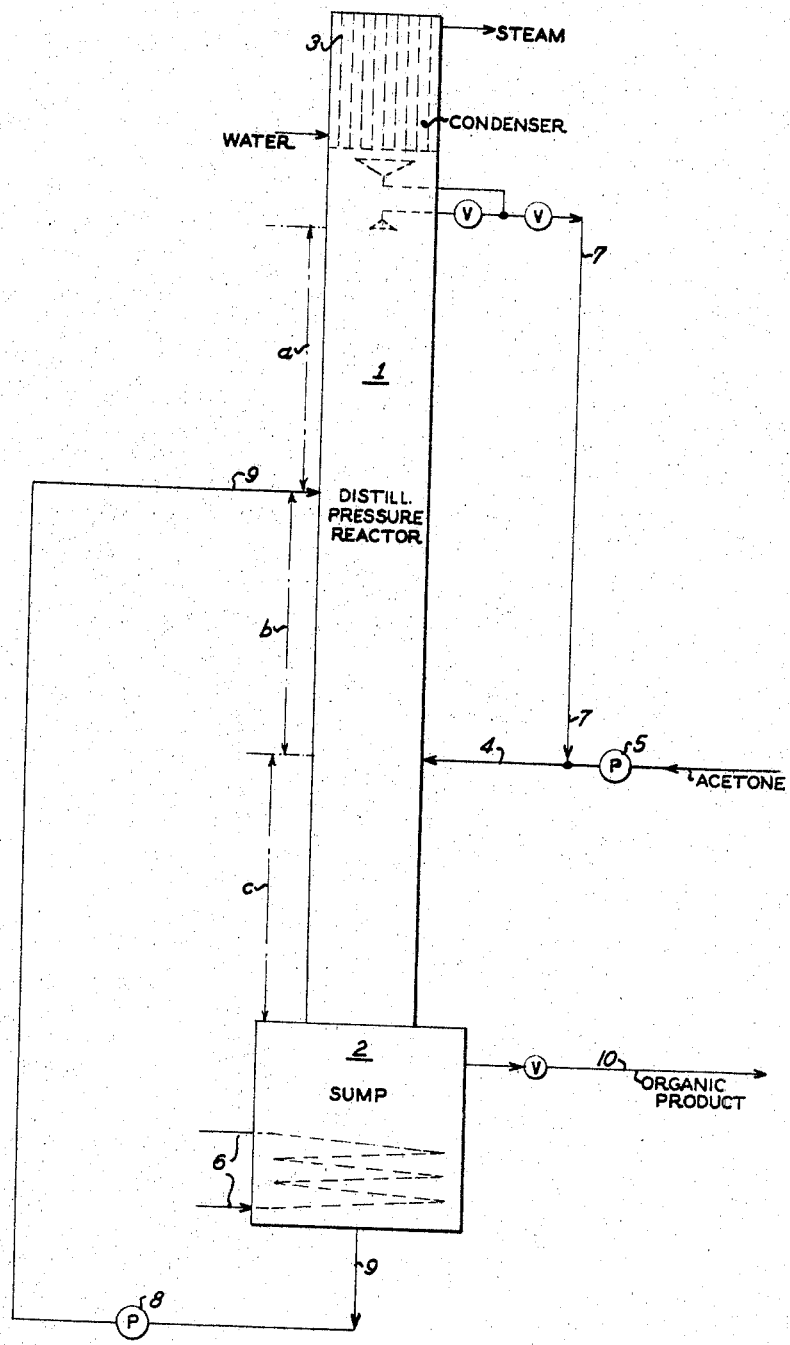

The present invention relates to a process for the production of pure condensation products of acetone, and more particularly to such a process wherein acetone is condensed in the presence of alkali in a pressure distillation reaction zone whereby the acetone is condensed catalytically and the condensation reaction products are recoverable in pure form.

It is known that a series of side reactions occur during the condensation of acetone to isophorone, which side reactions considerably adversely affect the quality and quantity of the overall condensation. As a result of these side reactions, mesityl oxide and over-condensates occur in considerable quantities in the acetone-condensation product reaction mixture. Therefore, attempts have been made to recover these by-proucts for use in some form, so that the overall condensation will be rendered more economical. In addition to the foregoing by-products, compounds such as, for example phorone, beta-isophorone, and xylitones, are also formed during the acetone condensation reaction. While the latter compounds are concededly less important with respect to their quantity in the reaction mixture, their presence is detrimental to the customary subsequent work up of the reaction mixture to recover isophorone which is the most desirable product commercially resulting from the acetone catalytic condensation. In this connection, during the usual distillation which follows the condensation, phorone, beta-isophorone and xylitones can only be separated from the desired isophorone to a partial extent, and then only under uneconomical conditions. The foregoing by-products, and especially phorone, beta-isophorone, and xyltones, produce changes in the make up of the isophorone product obtained, particularly as a result of decompositions in the technical isophorone product which occur during the course of time. Such decompositions produce discolorations, acid formation by way of oxidative decomposition, etc., whereby the quality of the isophorone product is considerably decreased and its utilization as a solvent or as a pure starting material for various sytheses is impaired. Accordingly, a practical answer to the question of how to remove the objectionable by-products which occur in significant amounts from the acetone-condensation products, in order to obtain isophorone of higher purity and reusable materials would find wide commercial acceptance.

One conventional method for working up the condensation products of acetone employs a liquid phase treatment of the condensation products with an aqueous alkali solution of 0.5 to 25% concentration at a temperature between 130 and 235 degrees C. In this manner, however, comparatively insufficient yields of reusable substances are obtained. This is due to the fact that the acetone formed from the hydrolytic cleavage of the by-products recondenses at least in part to xylitones in the reaction mixture, including isophorone, whereby such xylitones, in turn, once more manifest the usual difficulties in the work up to pure isophorone, and lead to later objectionable decompositions in the technical isophorone product upon standing. The liquid phase alkali treatment of the acetone-condensation products possesses the further disadvantage that it may be applied only with respect to reaction products which contain no more than 10% isophorone and which are free from by-products having a boiling point lower than that of xylitone.

According to a further conventional process, isophorone reaction mixtures may be purified where the same are contaminated with only slight amounts of impurities; specifically the acetone-condensation product reaction mixture is treated in liquid phase with fuller's earth and/or acid agents, such as for example toluene sulfonic acid, in order to convert the slight impurities present to innocuous form. Nevertheless, just as in the case with the former conventional process, this conventional process has not found wide application since the results achieved are not economically significant.

A further technique for working up the acetone-condensation reaction mixture contemplates the removal of unreacted acetone from the reaction mixture by distillation thereof at normal pressure, and thereafter the recovery of the end product by subsequent distillation steps. In this regard, once the unreacted acetone has been removed, the reaction mixture is subjected to vacuum distillation in a series of after-connected columns for the successive removal of the more easily volatile substances present. The number of after-connected columns will depend upon the number of substances present in the isophorone-containing reaction mixture which must be removed as well as the degree of purity desired for the isophorone product. Usually, about 4–6 series connected distillation columns are required for removal of the objectionable by-products present in the acetone-condensation reaction mixture so that a reasonably pure isophorone product may be recovered. It is obvious from the fact that a plural number of steps involving at least 4 to 6 distillation columns must be used that an unfavorable relationship exists between the acetone condensation to form isophorone and the subsequent work up of the reaction mixture, the subsequent work up requiring a disproportionately high technical and economical expenditure. Moreover, still further significant disadvantages are apparent. In this connection, it is clear that the greatest proportion of the energy and apparatus requirements are attributable to the distillation step employed for recovering acetone from the condensation reaction mixture. Considering the number of successive distillation steps required to obtain a reasonably pure isophorone product as well as the amount of reflux necessary for the normal distillation to remove acetone from the condensation reaction mixture, it will be evident that in a normal pressure acetone distillation column, acetone will have to be driven off in an amount of about 20 times the amount of condensation reaction product present. Moreover, the heat of condensation of the quantities of acetone drawn off overhead during the distillation can in no way be recovered readily and completely, and in fact extraneous cooling is even applied to condense to liquid form the distilled acetone vapors ascending to the head of the column. Once the acetone vapors are condensed to liquid form, the liquid acetone is then recycled to the acetone condensation reaction to form further isophorone, wherein added energy is required for increasing the temperature and pressure of such acetone to achieve the proper reaction state for catalytic conversion to isophorone. Besides, the additional energy requirements, supplmental apparatus arrangements are required, such as pumps, heat exchangers, etc. in order to enable the recycled acetone to be effectively reacted to produce once more the isophorone-containing reaction mixture with the desired ratio of constituents therein, i.e. isophorone, unreacted acetone, etc.

Various conventional methods are known whereby acetone may be condensed catalytically to form the desired isophorone. For instance, in accordance with one method acetone in vapor phase or in liquid phase may be condensed over solid catalysts. These methods employing solid catalysts, however, possess considerable disadvantages and therefore are not widely employed. A more favorable method consists in employing the catalyst in liquid form, such as, for example, as an aqueous solution. In this connection, acetone in liquid phase is reacted in the presence of the aqueous catalyst under known conditions of temperature and pressure, usually with agitation of the ingredients. Agitation is often employed due to the fact that a primary two-phase state of the starting materials exists on account of the limited solubility of acetone in the aqueous catalyst phase.

A particularly favorable technique for carrying out the solution-condensation of acetone may be achieved in a reaction mixture representing a homogeneous phase at least preliminarily. This is realized by the addition of a very slight quantity of alkali (NaOH, KOH, etc.), for example, up to about 0.1% of alkali based upon the total liquid present, using a solvent medium, such as water, alcohol, etc. Proceeding from a mixture of 80% by volume of acetone and 20% by volume of water, containing 0.04% by weight of alkali based upon the total quantity of acetone and water in the mixture, the solution-condensation will lead to a reaction product perhaps having a composition by volume of 70% acetone, 19% water, 6% isophorone, 2% over-condensates, 1.9% mesityl oxide, and slight quantities of other constituents, such as phorone, beta-isophorone, etc. Such a reaction mixture will be obtained usually if the solution-condensation reaction is carried out at comparatively low temperatures whereby the formation of unduly large amounts of higher condensates and condensates not directly usable in the form obtained will be avoided.

Where larger quantities of alkali are employed in the acetone condensation reaction, generally a two-phase liquid mixture results, whereas when smaller quantities of alkali are used with corresponding adjustments in the amount of water and/or alcohol employed, a homogeneous phase mixture will occur. Often an aliphatic alcohol, such as ethanol or methanol, will improve the solubility conditions of the reaction mixture. Depending upon the particular conditions chosen, different rates of conversion will result as well as different compositions of the constituents in the condensation reaction product mixture.

It is an object of the present invention to overcome the foregoing drawbacks and to provide a process for the production of pure condensation products of acetone in the presence of alkali under the simplest conditions and with a minimum formation of undesired by-products.

It is another object of the present invention to provide a process for the catalytic condensation of acetone to isophorone in high purity and high yield in a liquid phase-vapor phase system wherein initial condensation by-products of acetone are subjected to cleavage to form further isophorone and acetone as well as molecular rearrangement and reformation of overcondensates to isophorone.

Other and further objects of the invention will become apparent from a study of the within specification and accompanying drawing, in which the figure illustrates schematically an acetone condensation reactor and distillation column for carrying out the process of the present invention.

It has been found in accordance with the present invention that a process for the production of pure condensation products of acetone in the presence of alkali may be effectively provided, the process comprising introducing acetone into a pressure distillation reaction zone, having a head and a sump, at a point intermediate the head and the sump of the zone, introducing alkali solution into the zone at a point intermediate the head thereof, and the point at which the acetone is introduced thereinto, distilling the acetone under pressure in the zone in counter-current contact with the alkali solution between the points of introduction to form acetone condensation reaction products. The acetone being distilled is condensed to liquid form in the head of the zone and recovered from said head in condensed liquid form. A portion of the condensed liquid acetone is returned to the head of the column as reflux while the remainder of the condensed liqiud acetone is recycled to the zone at said point of introduction of acetone thereinto. The alkali solution and the acetone-condensation reaction product forming as a consequence of the reaction are collected in the sump of the zone so that a portion of the collected alkali solution may be recycled to the zone at said point of introduction of the alkali solution thereinto, while the condensation reaction products remaining are recovered from the sump of the zone. Conveniently, the condensation reaction products recovered from the sump of the zone may be subjected to subsequent vacuum distillation to recover pure isophorone, formed by the previous acetone condensation in the presence of the alkali solution, from the remaining condensation reaction products, i.e. overcondensates, etc.

Preferably, the pressure in the zone is adjusted to maintain a temperature between about 140 and 250 degrees C. (for isophorone 140–250°, for mesityl oxide 100–140°) in the portion of the zone between the points of introduction of acetone and alkali solution. The alkali is preferably present in an amount within the range between about 0.02 and 0.1% by weight based upon the total liquid content present. The alkali solution is commonly an aqueous solution wherein the water may be present in an amount up to about 20% by weight based upon the total liquid content present, although amounts at least about 50% and even 60% by weight based upon the total liquid content may be used especially where particularly pure acetone-condensation reaction products are sought to be obtained from the sump of the zone.

In this connection, at least a portion of the water in the aqueous solution may be replaced by an aliphatic alcohol, such as ethanol or methanol, even the entirety of the water possibly being replaced by the aliphatic alcohol. Lower alkanols are preferred as the aliphatic alcohol. In general quantities of 3–10% by weight of alcohol based upon the total liquid content, are preferred. The alkali solution will collect in the sump of the zone as a lower aqueous phase while the condensation reaction products will collect in the sump as an upper organic phase.

In accordance with a particular embodiment of the invention, the temperature in the head of the zone is maintained at about 200 degrees C. while the temperature in the sump is maintained at about 231 degrees C. Consequently, the temperature in the portion of the zone between the points of introduction of the acetone and alkali solution into the zone will be maintained at about 210 degrees C. In order to effectively utilize the alkali solution, a portion thereof may be continuously recycled from the sump to the point of introduction of the alkali solution into the zone without loss of pressure. Obviously, a portion of the water present in the sump, corresponding to the water of condensation formed during the acetone condensation reaction, may be removed from the sump, while fresh acetone and alkali may be added at said points of introduction respectively, to make up for acetone and alkali consumed during the condensation reaction.

Preferably, the heat of condensation of the acetone being condensed to liquid form in the head of the column may be recovered and efficiently applied in the distillation for heating the sump.

Accordingly, the present invention represents an improvement in the process for the production of isophorone by catalytic condensation of acetone in the presence of alkali as catalyst, which comprises carrying out the catalytic condensation of acetone and the purification of the acetone condensation reaction products in a pressure distillation column having a head and a sump and an upper distillation stage, a median condensation reaction stage, and a lower condensation reaction product purification stage contiguously arranged between the head and sump, at a temperature between about 140 and 250 degrees C. by introducing acetone into the column at the boundary between the reaction stage and the purification stage, and introducing alkali solution into the column at the boundary between the distillation stage and the reaction stage, passing said alkali solution downwardly through the reaction stage while distilling the acetone under pressure and passing the distilling acetone vapors upwardly through the reaction stage in countercurrent to the alkali solution to catalytically condense the acetone in the presence of the alkali solution as catalyst so as to form isophorone and higher boiling acetone condensation reaction products, passing unreacted acetone vapors to the distillation stage and cooling the vapors in the head to condense the distilled acetone to liquid form thereat, returning a portion of the liquid formed acetone downwardly through the distilling stage to the reaction stage as reflux and recycling the remainder of the liquid formed acetone for introduction at said boundary between the reaction stage and the purification stage, passing the isophorone, higher boiling reaction products, and the alkali solution from the reaction stage to the purification stage, maintaining the temperature in the purification stage higher than that in the reaction stage, and the temperature in the reaction stage higher than that in the distillation stage, the temperature in the distillation stage, under the pressure of the distillation, being sufficient to maintain acetone in vapor form while preventing the upward passage of alkali solution thereinto and the temperature in the purification stage under the pressure of distillation being sufficient to purify the reaction products by causing the cleavage and reformation of the higher boiling condensation reaction products to acetone and further isophorone in the presence of the alkali solution, passing the acetone formed in the purification stage upwardly to the reaction stage and the isophorone formed in the reaction stage and the purification stage downwardly with the alkali solution to the sump, recycling a portion of the alkali solution from the sump for introduction at said boundary between the distillation stage and the reaction stage and recovering the isophorone produced from the sump.

In such procedure the preferred embodiment contemplates the alkali being present in an amount within the range between about 0.02 and 0.01% by weight based upon the total liquid content present, the temperature in the distillation stage being about 200 degrees C., in the reaction stage about 210 degrees C. and in the purification stage about 231 degrees C., the pressure being about 27 atmospheres absolute in the column and about 15–16 atmospheres absolute in the head, with a portion of the water present in the sump and corresponding to the water of condensation formed during the catalytic condensation of acetone being removed from the sump while fresh acetone and alkali are added to the acetone and alkali solution, respectively, being recycled to the corresponding boundary of the reaction stage to make up for the acetone and alkali losses.

Therefore, the fundamental concept of the present invention involves a particular linking of chemical and physical principles for the production of the desired condensation reaction products of acetone in a single system wherein the reaction, as well as the purification of the condensation products take place, i.e. condensation, distillation, and purification. The actual physical conditions of temperature and pressure, which are interrelated, will be adjusted in each case as the artisan will appreciate depending upon the chemical requirements for the qualitative catalytic condensation of acetone with a minimum of undesired by-products, such as mesityl oxide, phorone, beta-isophorone, xylitones, etc. By reason of the pressure distillation zone, the alkali solution in water and/or alcohol as solvent and the acetone will be brought to activation under distillation conditions sufficient to permit the condensation reaction to proceed whereby the acetone evaporating upwardly from the point of introduction into the distillation column will be converted in counter-flow with the alkali-containing solution passing downwardly from the point of introduction thereof, such that above the median reaction zone acetone separation from the alkali solution will occur as well as subsequent condensation to liquid form and recycling whereas a purification of the higher boiling condensation products of acetone will take place below the median zone at a point in the lower portion of the column.

It will be appreciated that where isophorone is sought to be obtained, increased reaction temperatures, preferably within the range of about 150–250 degrees C. are necessary and these temperatures are maintained by selecting suitable corresponding reaction pressures in the distillation column.

It will be appreciated that in accordance with the preferred embodiment of the invention, by reason of the condenser at the head of the column, necessary for liquifying the acetone vapors, the cooling water may be converted into steam which may be utilized either directly or indirectly for heating the sump of the column and minimizing the overall energy requirement for the distillation reaction. Thus, the more superheated steam generated during the liquifying of the acetone in the head condenser may be transformed in a practical manner into saturated steam of lower pressure for effectively heating the sump, whereby for the entire process, including condensation, distillation, and purification, in contrast to the conventional procedures, very little energy is lost.

Preferably, the quantities of acetone, alkali and water and/or alcohol are suitably adjusted with respect to one another that a homogeneous phase is obtained within the reaction zone. For this purpose, as aforesaid, only comparatively slight quantities of alkali are employed which normally are below 0.1% by weight based upon the entire reaction mixture. Excellent results are even achieved with alkali quantities of about 0.02%, as where the quantity of water or alcohol is normally below about 20% based upon the entire liquid present. Nevertheless, as will be appreciated by the artisan, it is also possible to employ higher quantities of water, for example up to 50 and even 60% by weight based upon the entire liquid present, although in these cases, a decrease in the rate of conversion manifests itself. On the other hand, the composition of the constituents in the condensation reaction product mixture formed is favorably influenced with the consequence that after simple distillation work up end products are obtained of outstanding quality which are practically free from discoloration and impurities. Naturally, the solubility and conversion conditions with respect to the reaction mixture and the reaction conditions may be favorably influenced as well in the known manner by reason of replacing a part or all of the water of the alkali solution by an aliphatic alcohol, such as methanol or ethanol.

Inasmuch as the process of the invention is not fundamentally limited to operation in homogeneous phase, it will be appreciated that larger quantities of alkali may be employed which correspond to those heretofore used in conventional processes, as well as increased quantities of water as desired.

Due to the system established within the pressure distillation column representing three zones situated in order from the lower portion to the upper portion of the column as a purification zone, a condensation reaction zone, and a separation zone, water will flow downwardly under the reaction conditions while acetone will vaporize upwardly in opposite direction thereto, considering the successive evaporation and liquifying steps of the acetone within the column.

Specifically, in the distillation system, through fractionation, a separation into lower and higher boiling constituents occurs, i.e. initially a separation into acetone and water. By the specific conditions of acetone recycling in accordance with the process of the invention, as well as recycling of alkali solution, the desired chemical condensation reaction is super-imposed in dependence upon the physical and catalytic conditions employed. The condensation products which form in the condensation reaction zone, i.e. the median zone or stage, in the same manner as the water of the alkali solution, pass downwardly through the column because of their low volatility in comparison to the acetone which vaporizes and passes to the head of the column. Surprising results are achieved in accordance with the invention in this manner by the counter-current conditions employed since a more favorable ratio of the desired constituents is attained in the composition or make up of the condensation reaction products as compared to the composition obtained in conventional homogeneous or continuous flow methods, particularly in the ratio of isophorone to overcondensates present and the total conversion results. The actual separation of the acetone in the column by distillation generally occurs under a pressure corresponding to that of the vapor pressure of water and acetone under the reaction conditions. This feature assures that a corresponding amount of the acetone liquifies at the head of the column and is recycled as direct reflux through the column.

Below the acetone introduction which forms a boundary between the median acetone condensation reaction zone or stage and the lower purification zone or stage, an acetone-free mixture of water and condensation reaction products very quickly collects which, in the case of the production of isophorone includes, in addition to isophorone, for example, mesityl oxide and overcondensates including phorone, beta-isophorone, xylitones, and similar compounds which considerably disturb the usual subsequent distillation work up for recovering pure isophorone. By reason of the presence of the alkali at the reaction temperature in the lower purification zone, chemical and thermal decomposition, particularly in the form of hydrolysis, advantageously takes place during the course of the distillation condensation which leads in the final analysis, after removal of the disturbing impurities, to a mixture consisting essentially of isophorone and a minor amount of the highest boiling overcondensates which are easily separated from isophorone and are not decomposable under the working conditions.

More specifically, the mesityl oxide is totally converted into acetone by a side reaction which is initiated at a temperature of about 140 degrees C. and which is completed in the shortest possible time under the distillation conditions carried out in accordance with the invention. The phorone present in the reaction mixture in the same way is converted into acetone as well as into isophorone, the latter occurring by ring closure. The temperatures required for the cleavage or reformation of phorone are about 170–200 degrees C. Finally, the xylitones, in particular, which are closely related to isophorone, are split up into acetone and isophorone at temperatures of about 200–220 degrees C. Therefore, the phorone and xylitones which would otherwise severely disturb the subsequent work up of the isophorone product obtained are chemically removed from the reaction product in a manner increasing the overall efficiency of the conversion and minimizing otherwise unusable by-products. In this connection, it will be appreciated that portions of higher boiling constituents are decomposed to lower boiling compounds which may be reused in the distillation and/or condensation reaction for the ultimate production of isophorone in pure form.

Thus, in the purification zone further isophorone is formed from the by-products present or substances are formed which are condensable to isophorone under the reaction conditions. It will be appreciated that the particular effect of the purification zone is enhanced by the fact that the lighter boiling constituents, particularly acetone, are immediately removed therefrom upon formation, whereby an undesired equilibrium is avoided. The shift of equilibrium to the cleavage and/or reformation of the higher boiling and lower boiling constituents permits an overall economic and efficient operation to be practiced.

With respect to the two liquid phases which normally collect in the sump of the column, the upper organic phase may be conveniently drawn off depending upon the quantity being accumulated and thereafter processed in the simplest manner by a further distillation step to produce a corresponding isophorone product of high purity. The aqueous phase may be continuously recycled advantageously, without any intervening decrease in pressure, back into the distillation column at the boundary between the distillation zone and the median condensation reaction zone. It will be appreciated that the increase in water due to the acetone condensation, i.e. two mols of water per mol of isophorone formed, may be removed from the system in a simple manner. A natural purification of water is achieved and the alkali dilution as well as the loss of alkali consumed through neutralization side effects may be compensated for by fresh alkali additions in the same manner as the consumed acetone is adjusted by such fresh additions.

The present invention is further illustrated by the following example, and it is to be understood that the invention is not to be limited thereby.

*Example*

The process is carried out using an apparatus such as that shown in the drawing which includes a distillation pressure reactor 1 having a length of 8 meters and an internal column diameter of 100 mm., having a sump 2 of 30 liter capacity and a condenser 3 at the head of the column arranged for the direct production of steam from the cooling water. Fresh acetone is introduced into the column through line 4 by means of a pump 5, the acetone quantity corresponding to that being consumed in the condensation reaction which leads to isophorone and higher condensation reaction products. Line 4 enters the column at a lower point thereof and 2.8 kg. of acetone enter the column per hour through line 4. A temperature of 210 degrees C. is maintained in the reaction zone intermediate the head and the sump of the column, whereby the head or condenser 3 which causes the generation of steam as a result of the acetone liquification, is maintained under a pressure of 15.6 atmospheres absolute. Simultaneously, a pressure of 27 atmospheres absolute sets in in the distillation column which corresponds to the vapor pressure of acetone at 200 degrees C. Accordingly, within the reactor 1, a constant temperature gradient of 200 degrees C. in the head to 231 degrees C. in the sump is achieved. The capacity of the heating coils of the sump is adjusted so that 25 kg. of acetone are liquified in condenser 3 per hour, such that 10 kg. per hour thereof are recycled directly back into the column as reflux while the remaining 15 kg. per hour flow off through line 7 for recycling together with fresh acetone make up into the column at the lower point.

In sustained stationary operation, the sump contains a two phase mixture consisting of an upper organic layer and a lower aqueous alkali layer. The aqueous alkali layer (=NaOH solution of 0.15% by weight) is recycled by means of pump 8 through line 9 to the upper point in the reactor 1 such that 6 kg. per hour of alkali solution enter the upper portion of the reactor whereby to maintain the necessary alkali content of the reaction medium of about 0.03% based upon the total liquids present. The alkali, of course, is present completely in dissolved form. From the organic phase of sump 2, 2.1 kg. of a condensation product, practically free from mesityl oxide and phorone, are drawn off via line 10. The xylitones contained in this product are reduced to such a minimum by reason of the hydrolytic reactions which occur in the purification zone, that they do not disturb the subsequent distillation work up of the condensation product desired, i.e. isophorone. The sump 2 is conveniently heated by heating coil 6 using steam obtained from the water employed to cool the condenser 3 in the head of reactor 1.

The organic product drawn off from sump 2 via line 10 represents a distribution ratio by weight of isophorone to condensation reaction products of about 91:9 as compared with 80:20 obtained in accordance with the usual conventional techniques. These products are distilled in an after connected distillation system composed of two columns. These columns have a length of 6 meters and an inner diameter of 80 millimeters. They are filled throughout with 8 millimeter-Berl-saddles. Both columns are under a vacuum of 100 millimeters. In the first column are withdrawn all products of a lower boiling point than isophorone (water, residues of beta-isophorone), and in the second main-column the sump product of the first column is separated in no longer hydrolyzable over-condensates and a very pure isophorone. In the first column is maintained a reflux ratio of $R=3:1$, the temperatures being 72° C. in the head and 135° C. in the sump, and in the second column the reflux ratio is $R=5:1$, the temperatures being 132° C. in the head and 195° C. in the sump. In the first column are withdrawn a quantity of about 5% by weight, based upon the product charged. At the second column 91% by weight based on the product charged are withdrawn. This is an extremely pure isophorone (99.9%). The product is completely colorless and exhibits no discolorations whatsoever even after standing over an extended period of time.

As may be noted from the drawing, by reason of the introduction of the alkali solution and of the acetone at the particular points of the reactor, boundary conditions are obtained which effectively partition the column into three functionally separate zones, namely an uppermost distillation zone $a$, an intermediate or median condensation reaction zone $b$, and a lowermost purification zone $c$. The actone entering column 1, through lines 4 and 7 separates the reaction zone $b$ from the purification zone $c$ whereas the alkali solution entering the column through line 9 separates the reaction zone $b$ from the upper distillation zone $a$ so that the downwardly moving liquid alkali solution will flow in counter-current to the heated acetone vapors moving upwardly toward the distillation zone for effective condensation reaction in the desired manner.

Accordingly, the furtherance of secondary reactions superimposed upon the pure pressure distillation and condensation reactions are provided which operate independently of said reactions so that a particularly favorable influence upon the final composition and quality of the sump product will be attained. Consequently, an essential simplification of the final work up steps is possible such that a lesser number of subsequent distillation stages will be necessary in order to obtain isophorone of highest purity. As is appreciated, in the sump of the column where an extensive removal of acetone has already been obtained, a partial-to-complete decomposition and/or reformation takes place of those compounds which would either burden the further work up or even serve to decrease the quality of the end product, such decomposition and reformation being achieved through the intimate contact of the two phases in the sump by reason of the active presence of alkali catalyst.

On the other hand, the mesityl oxide present as a result of condensation reaction is reverted once more to acetone form and continuously removed from the column by distillation whereby the further work up of the organic phase sump product may omit an after-connected mesityl oxide distillation column.

An important advantage of the invention, in this regard, is that not only is the conversion of the major portion of the by-products back into usable form achieved, but also the essential removal of the comparatively small quantities of impurities, such as xylitone, etc., which, although insignificant in amount, are very disturbing in the further work up of isophorone. It should be noted that while isophorone is present under the reaction conditions of the pressure distillation reaction, on account of its particular stability, isophorone is not subject to cleavage, decomposition, or molecular rearrangement, even to a minor degree. This result is extremely surprising in view of the reaction conditions, and may be explained, or at least be traced to the distillation of acetone which forms or which is present in the reaction mixture, under the positive pressure employed. A further advantage of the invention is found in the lower concentration as well as the lower consumption of alkali hydroxide catalyst in contrast to the normal quantities required for the conventional conversion of acetone and of the by-products of the acetone condensation reaction.

What is claimed is:

1. Process for the production of isophorone from acetone in the presence of alkali, which comprises introducing acetone into a pressure distillation reaction zone, having a head and a sump, at a point intermediate the head and the sump of said zone, introducing aqueous alkali solution having a concentration of alkali within the range between 0.02 and 0.1% by weight based on the total liquid content present into said zone at a point intermediate the head thereof and the point at which said acetone is introduced thereinto, distilling said acetone at a temperature of about 100–250° C. under elevated pressure in said zone in countercurrent contact with said alkali solution between the points of introduction to form in said zone acetone condensation reaction products including isophorone, condensing to liquid form in the head of said zone the acetone being distilled, recovering from said head the condensed liquid acetone and returning a portion thereof to the head as reflux and recycling the remainder of the condensed liquid acetone to said zone at said point of introduction of acetone, collecting the alkali solution and said acetone condensation reaction products including isophorone in the sump of said zone, recycling a portion of the collected alkali solution to said zone at said point of introduction of alkali solution, and recovering the condensation reaction products including isophorone from the sump of said zone.

2. Process according to claim 1 wherein the condensation reaction products recovered including isophorone are subjected to subsequent vacuum distillation to recover pure isophorone from the remaining condensation reaction products.

3. Process according to claim 1 wherein the pressure in said zone is adjusted to maintain a temperature between about 140 and 250° C. in the portion of said zone between said points of introduction of acetone and alkali solution.

4. Process according to claim 3 wherein the water in the aqueous solution is present in an amount up to about 20% by weight based upon the total liquid content present.

5. Process according to claim 3 wherein the water in the aqueous solution is present in an amount of at least about 50–60% by weight based upon the total liquid content present for obtaining particularly pure isophorone from said sump.

6. Process according to claim 3 wherein the temperature is at about 200° C. in the head of said zone, at about 231° C. in the sump, and at about 210° C. in the portion of said zone between said points of introduction of acetone and alkali solution into said zone.

7. Process according to claim 3 wherein said portion of the alkali solution is continuously recycled from the sump to said point of introduction without loss of pressure.

8. Process according to claim 3 wherein a portion of the water present in the sump, corresponding to the water of condensation formed during the acetone condensation reaction, is removed from the sump, while fresh acetone and alkali are added at said points of introduction, respectively, to make up for the acetone and alkali consumed during the condensation reaction.

9. Process according to claim 1 wherein the latent heat of condensation of the acetone to liquid form is recovered by indirect contact of the acetone with a heat exchange medium and said heat applied in the distillation by indirect contact of said heat exchange medium with the sump of said zone.

10. In the process for the production of isophorone by the catalytic condensation of acetone in the presence of alkali as catalyst, the improvement which comprises carrying out the catalytic condensation of acetone and the purification of the resulting isophorone-containing acetone condensation reaction products for producing pure isophorone in a pressure distillation column having a head and a sump and an upper distillation stage, a median condensation reaction stage, and a lower condensation reaction product purification stage contiguously arranged between the head and sump, under elevated pressure at a temperature between about 140 and 250° C., by introducing acetone into the column at the boundary between the reaction stage and the purification stage and introducing alkali aqueous solution having a concentration of alkali below 0.1% by weight based on the total liquid content present into the column at the boundary between the distillation stage and the reaction stage, passing said alkali solution downwardly through said reaction stage while distilling said acetone under pressure and passing the distilling acetone vapors upwardly through said reaction stage in countercurrent to said alkali solution to catalytically condense said acetone in the presence of said alkali solution as catalyst to form isophorone and higher boiling acetone condensation reaction products having a higher boiling point than isophorone, passing unreacted acetone vapors to said distillation stage and cooling said vapors in said head to condense the distilled acetone to liquid form, returning a portion of the liquid form acetone downwardly through said distilling stage to said reaction stage as reflux and recycling the remainder of the liquid form acetone for introduction at said boundary between the reaction stage and the purification stage, passing the isophorone, higher boiling reaction products and the alkali solution from said reaction stage to said purification stage, maintaining the temperature in the purification stage higher than that in the reaction stage and the temperature in the reaction stage higher than that in the distillation stage, the temperature in the distillation stage under the pressure of the disillation being sufficient to maintain acetone in vapor form while preventing the upward passage of alkali solution thereinto and the temperature in the purification stage under the pressure of the distillation being sufficient to purify the reaction products by causing the cleavage and reformation of said higher boiling condensation reaction products to acetone and further isophorone in the presence of said alkali solution, passing the acetone formed in the purification stage upwardly to the reaction stage and the isophorone formed in the reaction stage and the purification stage downwardly with the alkali solution to the sump, recycling a portion of the alkali solution from the sump for introduction at said boundary between the distillation stage and the reaction stage, and recovering the isophorone produced from the sump.

11. Improvement according to claim 10 wherein the alkali is present in an amount within the range between about 0.02 and 0.1% by weight based upon the total liquid content present, the temperature in said distillation stage being about 200° C., in said reaction stage about 210° C. and in said purification stage about 231° C., the pressure being about 27 atmospheres absolute in the column and about 15–16 atmospheres absolute in said head, a portion of water present in the sump and corresponding to the water of condensation formed during the catalytic condensation of acetone being removed from the sump, while fresh acetone and alkali are added to the acetone and alkali solution, respectively, being recycled to the corresponding boundary of said reaction stage to make up for the acetone and alkali losses.

References Cited
UNITED STATES PATENTS

| | | | |
|---|---|---|---|
| 2,351,352 | 6/1944 | McAllister et al. | 260—586 |
| 2,419,051 | 4/1947 | Ballard et al. | 260—586 |
| 2,566,564 | 9/1951 | Highet et al. | 260—586 |

FOREIGN PATENTS

| | | |
|---|---|---|
| 1,095,818 | 12/1960 | Germany. |
| 733,650 | 7/1955 | Great Britain. |

LEON ZITVER, *Primary Examiner.*